United States Patent [19]

Sheldon

[11] Patent Number: 5,787,758
[45] Date of Patent: Aug. 4, 1998

[54] THREE-AXIS MACHINE FOR RAPID AND RIGID MANIPULATION OF COMPONENTS

[75] Inventor: Paul C. Sheldon, Mequon, Wis.

[73] Assignee: Sheldon/Van Someren, Inc., Wauwatosa, Wis.

[21] Appl. No.: 707,125

[22] Filed: Sep. 3, 1996

[51] Int. Cl.⁶ ............................ B25T 11/00; B23C 1/06
[52] U.S. Cl. ................ 74/490.07; 409/201; 409/235; 414/917; 901/22
[58] Field of Search ...................... 409/145, 201, 409/216, 235, 241; 408/234; 901/22, 23; 248/631, 653, 654; 74/490.03, 490.04, 490.07; 414/917

[56] References Cited

U.S. PATENT DOCUMENTS

| 4,762,459 | 8/1988 | Morita et al. ............ 901/22 X |
| 4,806,068 | 2/1989 | Kohli et al. ............. 901/22 X |
| 5,028,180 | 7/1991 | Sheldon et al. .......... 901/22 X |
| 5,388,935 | 2/1995 | Sheldon ................... 409/201 |

FOREIGN PATENT DOCUMENTS

| 1296401 | 3/1987 | U.S.S.R. .................. 901/22 |
| 1505773 | 9/1989 | U.S.S.R. .................. 901/22 |

OTHER PUBLICATIONS

Jean-Pierre Merlet, published on the Internet at http://www.inria.fr/prisme/personnel/merlet eng.html, §Parallel manipulators, drawings and references for Manipulateurs a 3 degres de liberte.

*Primary Examiner*—Charles A. Marmor
*Assistant Examiner*—Troy Grabow
*Attorney, Agent, or Firm*—Robert A. Van Someren

[57] ABSTRACT

A three-axis machine is disclosed. The machine includes a machine component to which a workpiece or tool can be attached. An actuator, such as three powered extensible legs, is connected between the machine component and a support structure. Three control arms also are connected between the machine component and the support structure. Preferably, each control arm is pivotably connected to the support structure and the machine component and includes a pair of four-bar linkages connected in series. The control arms are oriented to permit rapid movement of the machine component along any or all of the three linear axes, while restricting rotational movement of the machine component along the rotational axes.

20 Claims, 5 Drawing Sheets

THREE-AXIS MACHINE FOR RAPID AND RIGID MANIPULATION OF COMPONENTS

FIELD OF THE INVENTION

The present invention relates generally to machines for moving objects through space, and particularly to a three-axis machine for rapidly and rigidly moving objects through space while restricting rotational movement of the object.

BACKGROUND OF THE INVENTION

Generally, an object can be moved through space with six degrees of freedom. In other words, the object can be moved along six different axes, three of which are linear axes, and three of which are rotational axes. The three linear axis are commonly known as the x-axis, y-axis and z-axis. An object's movement through space from one point to another can be tracked along the three linear axes, x, y and z. However, that same object can twist, i.e. pivot or rotate, about each of the linear axes. Thus, there are three rotational degrees of freedom that are commonly represented by three rotational axes, referred to as the a-axis, b-axis and c-axis. The rotational axes sometimes also are known as roll, pitch and yaw.

It should be noted that rotational movement or rotational degrees of freedom of movement of the object are understood as rotation of the object about the linear axes, x, y, z extending through the object. Reference to the restriction of rotational movement of the object does not imply that the object cannot be moved along arcuate or circular paths from one point to another in space. Such arcuate or circular travel can be defined solely as movement along the three linear axes if no twisting of the object occurs.

Depending on the requisite manipulation of an object, machines are designed to move various objects through space with one to six degrees of freedom. For example, machine tools used for milling, drilling, and grinding workpieces are sometimes designed to manipulate an object, e.g. a cutting tool, along all six axes. However, many applications only require the object be moved with the three degrees of freedom defined by the three linear axes. In fact, in both situations, it often is undesirable to allow any twisting or rotational movement of the object, e.g. tool, because this can lead to poorly formed parts that do not meet modem tolerance requirements. This is particularly true with machines that generate substantial force loads, such as loads that occur during milling or drilling operations.

To combat the undesirable twisting and to maintain operational accuracy and precision, many three-axis machines use large cast components that move along precisely ground ways. The large, cast components reduce twisting of the object being moved, e.g., a spindle head for a drill or milling cutter. Simultaneously, the ways guide the heavy cast machine structures as they are moved along the x, y and z axes. Typically, such a machine includes a separate machine structure and a separate way or ways for each axis of movement. This leads to increased time and expense in building and maintaining the machine. Additionally, because of the mass of the solid machine structures, these machines are relatively slow in moving an object from one point to another.

The present invention addresses the foregoing drawbacks of existing three-axis machines.

SUMMARY OF THE INVENTION

The present invention features a machine, such as a machine tool, for moving an object along a predetermined path through space. The machine is designed for mounting to a support structure such as floor, base, platform, or overhead support structure.

The machine, according to a preferred embodiment of the invention, includes a machine component configured to carry the object along the predetermined path. An actuator is connected between the support structure and the machine component to selectively move the machine component with respect to the support structure. Additionally, a rotational control system is attached to the machine component to prevent rotational movement of the machine component along one or more of the rotational axes. The rotational control system includes a control arm having a first end attached to the machine component and a second end configured for pivotable attachment to the support structure. The control arm permits movement of the machine component along all three linear axes, while preventing movement of the machine about at least two rotational axes.

In a preferred embodiment of the invention, the actuator includes at least three control legs pivotably connected to the machine component and the support structure to move the machine component with respect to the support structure. According to one aspect of the invention, the rotational control system includes three control arms. Each of those control arms includes a pair of four-bar linkages connected in series to permit movement of the machine component along the three linear axes while providing rigid resistance to any rotational movement of the machine component along the three rotational axes. In this embodiment, the bars of the four-bar linkages are placed only in tension or compression.

According to yet another aspect of the invention, a method is provided for restricting rotational movement of a machine component. The method includes the steps of mounting the machine component to a support structure by an actuator capable of moving the machine component with respect to the support structure. The method further includes assembling a first four-bar linkage and a second four-bar linkage, and connecting them together in series. The first four-bar linkage is pivotably attached to the support structure and the second four-bar linkage is attached to the machine component to resist rotational movement of the machine component.

BRIEF DESCRIPTION OF THE DRAWINGS

The invention will hereafter be described with reference to the accompanying drawings, where like reference numerals denote like elements, and.

DETAILED DESCRIPTION OF THE PREFERRED EMBODIMENT

Figure 1:
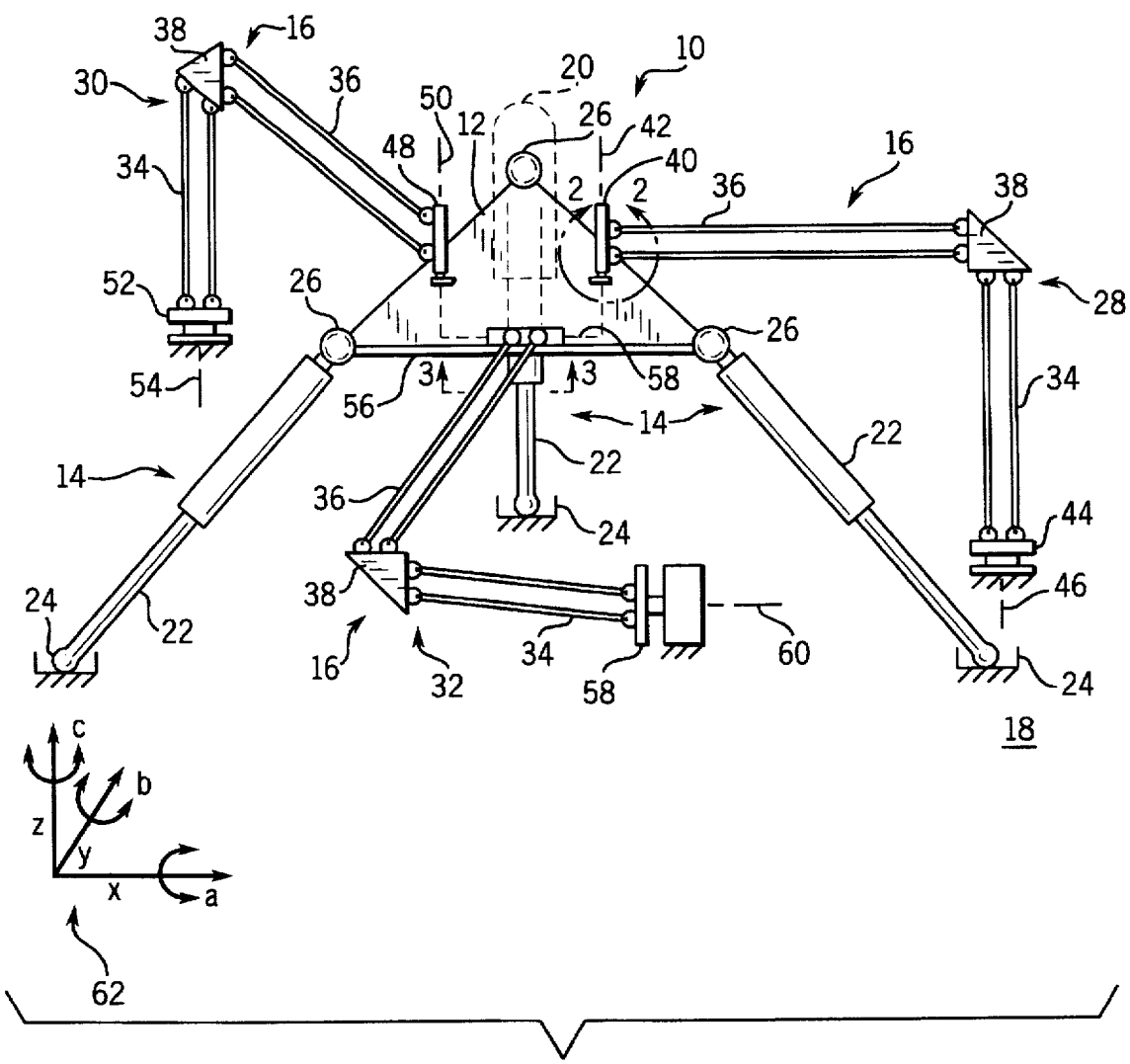
FIG. 1 is a perspective view of a machine according to a preferred embodiment of the present invention.

Referring generally to FIG. 1, a machine 10, according to a preferred embodiment of the invention, is illustrated. Machine 10 includes a machine component 12, an actuator 14 and a rotational control system 16. Actuator 14 and rotational control system 16 are attached to a support structure 18, illustrated in FIG. 1 as a floor. However support structure 18 can be any of a variety of support structures including floors, base plates, larger machine structures, overhead structures or any combination of support structures. Additionally, machine 10 can be mounted to extend above a horizontal support structure, to suspend from a support structure or to extend sideways from a vertical or angled support structure.

Machine component 12 can be made in a wide variety of forms and configurations, depending on the particular application of machine 10. For example, machine component 12 can be designed to carry various objects, including workpieces, reflective or other optical surfaces, parts and tools, such as spindles for drilling, boring, milling or grinding operations, or sensors such as touch probes. An exemplary object 20 is illustrated in FIG. 1.

Actuator 14 is designed to move machine component 12 with respect to support structure 18 and preferably includes three actuator legs 22. Actuator legs 22 are illustrated as extensible legs, but also can be hinged legs that fold inwardly and outwardly to move machine component 12. A variety of extensible actuator legs can be used depending on the application, and can include hydraulic actuators or servostruts, such as linear motor actuators or ball screw actuators. The desired extension and retraction of each actuator leg 22 would typically be controlled by, for instance, a machine controller (not shown), to move object 22 along a desired path. It also should be noted that the position of each actuator leg can be sensed by a variety of sensors known in the machine tool industry and described in the prior art. For example, some ball screw actuators include a sensor, e.g. a resolver or encoder, that tracks the rotation and thereby the extension and indicates the position of the actuator. Also, a sensing head and magnetic scale could be incorporated into each actuator leg to indicate position by tracking the extension and retraction of each leg.

Each actuator leg 22 is designed for pivotable connection to support structure 18 by a pivot mount 24, such as a ball and socket or universal joint. Pivot mounts 24 provide each actuator leg with at least two degrees of freedom to permit movement of object 20 along the x, y and z axes. Similarly, each actuator leg 22 is pivotably connected to machine component 12 by a machine component pivot mount 26 as illustrated in FIG. 1. Each machine component pivot mount 26 should also provide the actuator leg 22 with at least two degrees of freedom of movement to permit movement of the machine component along any combination of the three linear axes. An exemplary machine component pivot mount 26 is also a ball and socket pivot or universal joint.

In the embodiment illustrated in FIG. 1, rotational control system 16 includes three control arms 28, 30 and 32. Preferably, each of the control arms 28, 30 and 32 includes a first four-bar linkage 34 and a second four-bar linkage 36 connected in series by an attachment bracket 38.

Control arm 28 includes a first end 40 pivotably mounted to machine component 12 for rotational movement with a single degree of freedom about an axis 42. Control arm 28 also includes a second end 44 pivotably mounted to support structure 18 for rotational motion with one degree of freedom about an axis 46. Similarly, control arm 30 includes a first end 48 pivotably mounted to machine component 12 for rotation with one degree of freedom about an axis 50. Control arm 30 also includes a second end 52 pivotably mounted to support structure 18 for rotational movement with one degree of freedom about an axis 54. It is preferred that axes 42, 46, 50 and 54 be oriented substantially parallel to one another. Further, control arm 32 includes a first end 56 pivotably mounted to machine component 12 for rotational movement with one degree of freedom about an axis 58. Control arm 32 also includes a second end 58 pivotably mounted to support structure 18 for rotational movement with one degree of freedom about an axis 60. As illustrated, axis 58 is oriented in a transverse direction with respect to axis 42 and 50. It is preferred that axes 58 and 60 of control arm 32 be substantially parallel.

With reference to a diagram 62, the motion of machine 10 can be explained more fully. Machine component 12 and attached object 20 are moved through space by selective actuation of each actuator leg 22. However, during this movement, control arms 28, 30 and 32 cooperate to prevent any rotational movement of machine component 12. In other words, machine component 12 can be moved through space with three degrees of freedom defined by linear axes x, y and z. However, control arms 28, 30 and 32 prevent twisting, i.e. rotational movement of machine component 12 along rotational axes a, b and c. Specifically, control arms 28 and 30 extend from machine component 12 at an angle with respect to one another to prevent rotational motion along both the a-axis and the b-axis. Control arm 32 is oriented to prevent movement along the c-axis. The unique arrangement and attachment of the four-bar linkages permits free and rapid movement of machine component 12 in three linear degrees of freedom while preventing movement of machine component 12 in the rotational degrees of freedom.

It should be noted that the specific design of control arms 28, 30 and 32 will vary depending on space constraints, support structure design, and application of machine 10. However, in an exemplary orientation of control arms 28 and 30, their second four-bar linkages 36 form an approximately 90 degree angle with one another when their second four-bar linkages lie in a common plane and machine component 12 is disposed at a generally central working location. Similarly, it may be advantageous to attach control arm 32 to support structure 18 at a location lying generally in a common plane with machine component 12 when machine component 12 is at a central working location. However, there is substantial latitude as to the location at which control arm 32 can be attached to support structure 18 without deprecating the functionality of machine 10.

Figure 2:
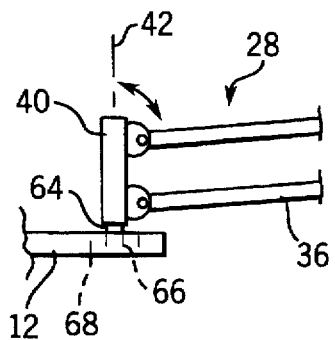
FIG. 2 is an enlarged partial view of FIG. 1 taken generally along line 2—2 illustrating attachment of a control arm to the machine component.
Figure 3:
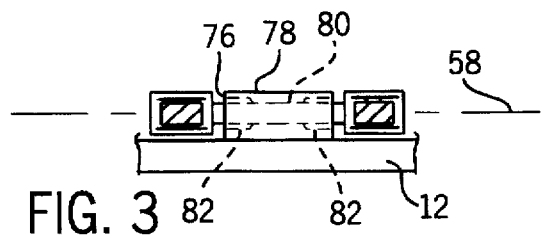
FIG. 3 is an enlarged partial view of FIG. 1 taken generally along line 3—3 illustrating attachment of a control arm to the machine component.
Figure 4:
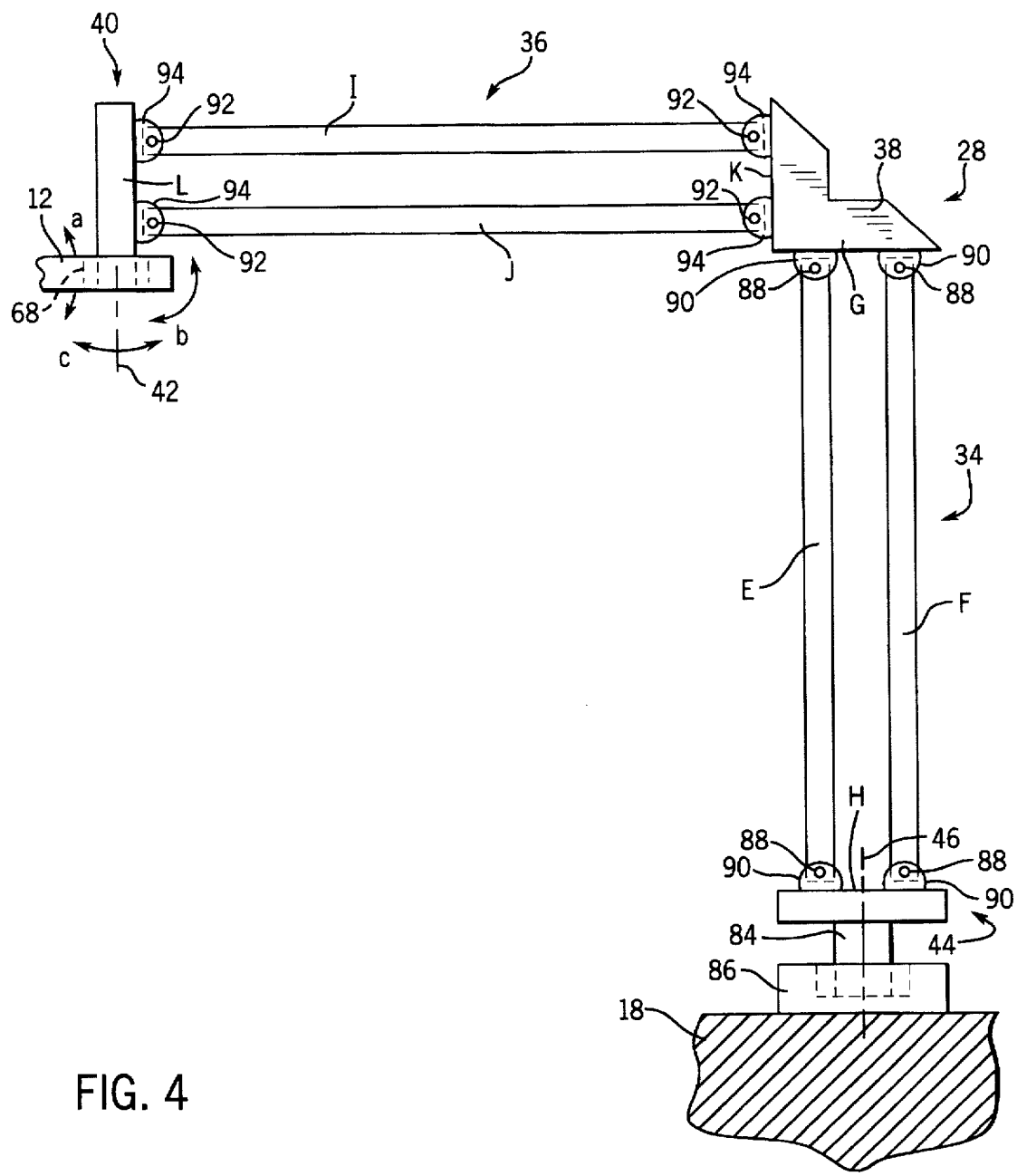
FIG. 4 is a side view of a control arm, according to a preferred embodiment of the present invention, connected between a support structure and the machine component.

Referring generally to FIGS. 2-4, the attachment of control arms 28, 30 and 32 to machine component 12 as well as the preferred structure of the control arms will be explained. As specifically illustrated in FIG. 2, first end 40 of control arm 28 can be rotatably mounted to machine component 12 such that the second four-bar linkage is disposed to one side of machine component 12. In this arrangement, first end 40 includes a pivot rod 64 extending from one end and received in an opening 66 formed in machine component 12. Preferably, pivot rod 64 is mounted in a bearing 68, such as a roller bearing or a pair of ball bearings, to facilitate a smooth pivoting motion of control arm 28 about axis 42.

Figure 2A:
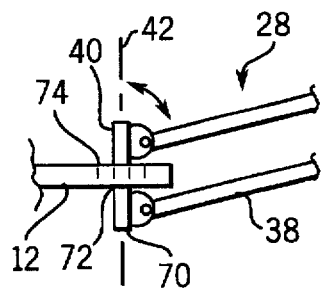
FIG. 2A is an alternate embodiment of the connection shown in FIG. 2.

In a second embodiment, illustrated in FIG. 2A, first end 40 comprises a pin 70 received through an opening 72 in machine component 12. In this embodiment, the second four bar linkage 36 is disposed partially on both sides of machine component 12, as illustrated. Pin 70 is mounted in a bearing 74, such as a roller bearing or a pair of ball bearings to facilitate pivoting of control arm 28 about axis 42. First end 48 of control arm 30 also can be mounted to machine component 12 as illustrated in either FIG. 2 or FIG. 2A.

As illustrated in FIG. 3, first end 56 of control arm 32 can be connected to machine component 12 by a rod 76 pivotably mounted in a boss 78 having an opening 80 therethrough. Preferably, rod 76 is mounted in a bearing 82, such as a pair of ball bearings. This arrangement facilities pivotal motion of control arm 32 about axis 58.

The structure and function of each of the control arms can be explained with reference to a single control arm, specifically control arm 28 shown in FIG. 4. As explained above, control arm 28 is pivotably mounted to machine component 12 at first end 40 and to support structure 18 at second end 44. For example, second end 44 may include a pin 84 rotatably received by a mounting bracket 86 attached to support 18. As with the attachment of first end 40 to machine component 12, the structure for mounting second end 44 to support structure 18 can have a variety of forms, but should permit second end 44 only one degree of freedom of motion, i.e., rotation about axis 46.

The first four-bar linkage 34 and the second four-bar linkage 36 of control arm 28 cooperate to prevent movement of machine component 12 along rotational axis b. The other control arms, 30 and 32, cooperate with control arm 28 to restrict movement of machine component 12 along all three rotational axes.

First four-bar linkage 34 includes four bars labeled as E, F and G, H that are linked at four pivot points 88 by brackets 90. Bars E and F are parallel and of the same length. Thus, as attachment bracket 38 is moved with respect to second end 44, bars E and F remain parallel.

Similarly, second four-bar linkage 36 includes four bars labeled as I, J, and K, L that are connected at four pivot points 92 by brackets 94. Bars I and J are parallel and of the same length. Thus, as machine component 12 is moved with respect to attachment bracket 38, bars I and J remain parallel. Because bars E and F of first four-bar linkage 34 are parallel to each other and connected in series with the parallel bars I and J of second four-bar linkage 36, forces acting on machine component 12 that tend to twist it along the b-axis are translated to support structure 18 through bars I,J and E,F in either tension or compression. Control arm 28, therefore, provides great rigidity and resistance to twisting motion along the b-axis.

Preferably, brackets 90 and 94 are designed to hold bars E, F and I, J, respectively, to one degree of rotational freedom about their respective pivot points 88 and 92. In other words, bars, E,F and I, J remain substantially parallel with a common plane during movement.

Connecting first four-bar linkage 34, having parallel, equal-length bars E and F, with second four bar linkage 36, having parallel equal-length bars I and J, as illustrated, ensures that first end 40 and axis 42 always remain oriented in the same direction regardless of where machine component 12 is moved in three dimensional space. Thus, machine component 12 is restrained from any rotational motion, other than rotational motion about axis 42. Control arm 32, as illustrated in FIG. 1, is oriented to prevent rotational movement of machine component 12 about axis 42, i.e. along the rotational axis c. As noted, the orientation of control arm 28 and its four-bar linkages provides rigid resistance to rotation of machine component 12 along rotational axis b. It also provides resistance to torsional forces acting to rotate machine component 12 along rotational axis a. However, because the four-bar linkages provide far greater resistance to forces that act on the bars in tension or compression rather than torsionally, it is often necessary to connect control arm 30 to machine component 12 to fully resist rotation of the machine component along rotational axis a.

Bars E, F, and I, J could be replaced with bowed bars or bars of other configurations, but it is preferred that straight, parallel bars of equal length be used. This configuration provides control arm 28 with great structural rigidity against any movement of machine component 12 along rotational axis b. Similar analyses apply to control arm 30 in preventing rotation along the a-axis and to control arm 32 in preventing rotation along the c-axis.

Figure 5:
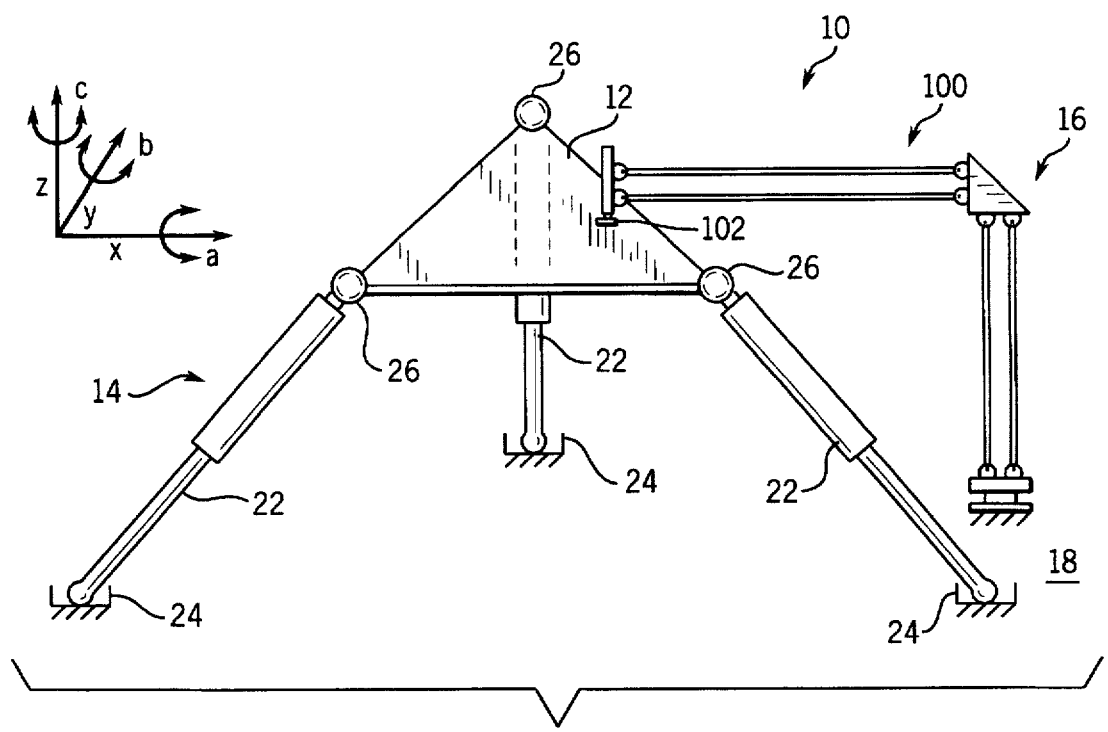
FIG. 5 is an alternate embodiment of the machine illustrated in FIG. 1.
Figure 6:
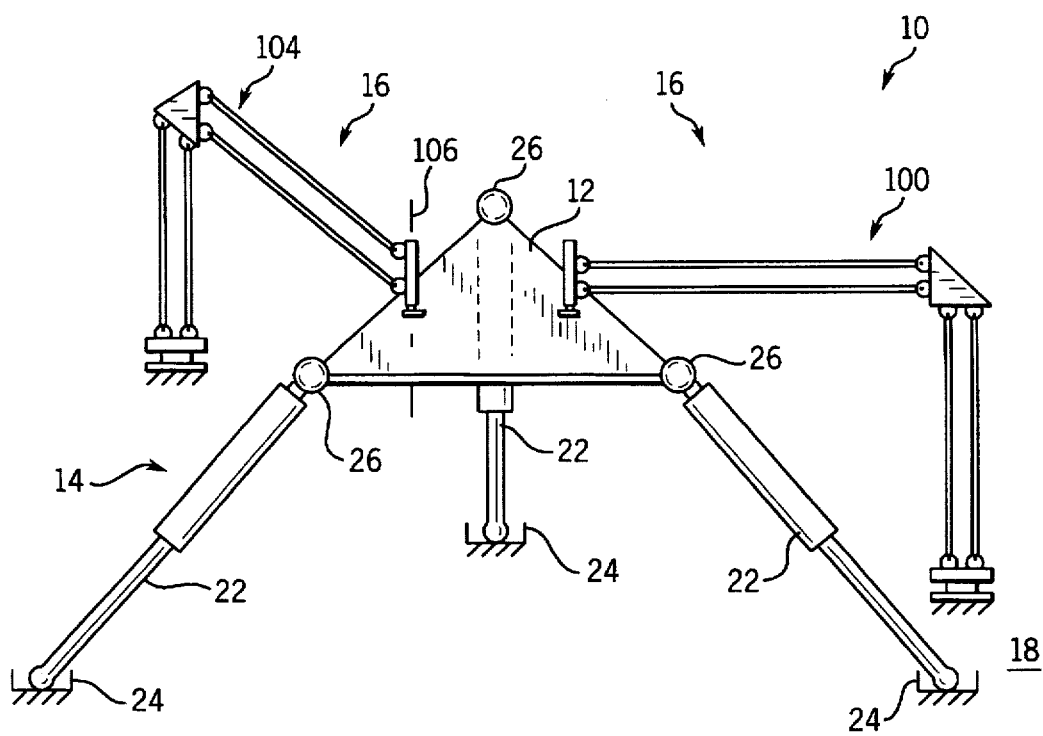
FIG. 6 is another alternate embodiment of the machine illustrated in FIG. 1.

As alluded to above, some applications of machine 10 may not require three control arms. Alternate embodiments of machine 10 are illustrated in FIGS. 5 and 6, where either one or two control arms are attached to machine component 12. Referring specifically to FIG. 5, a single control arm 100 is connected between support structure 18 and machine component 12. In this configuration, control arm 100 resists movement of machine component 12 along two rotational axes if it is rotationally attached to machine component 12 as described above with reference to FIGS. 1–4. However, if control arm 100 is rigidly affixed to machine component 12 at a location 102, then the control arm resists rotational movement of machine component 12 along all three rotational axes. This configuration, of course, provides the greatest rigidity with respect to forces that act through the four-bar linkages of control arm 100 solely in compression and tension (i.e., forces acting along rotational axis b) as described above with reference to FIG. 4.

If greater rigidity is required to combat twisting of machine component 12 along another rotational axis, a second control arm 104 can be added as illustrated in FIG. 6. In this embodiment, control arm 100 is rigidly affixed to machine component 12 and control arm 104 is rotatably mounted to machine component 12 for a single degree of freedom of rotation about an axis 106. This configuration will provide great resistance to rotation of machine component 12 along rotational axes a and b, because the parallel bars of control arms 100 and 104 are placed solely in tension or compression by forces acting along those axes. In certain applications, it may not be necessary to provide the greater rigidity against movement of machine component 12 along rotational axis c that otherwise would be afforded by a third control arm. For example, some tools have a rotating spindle for turning a cutter about the z-axis, and therefore it may be less essential to rigidly hold the tool against rotation along rotational axis c. It should also be noted that in the embodiments illustrated in FIGS. 5 and 6, there will be a slight translation of machine component 12 along the c-axis as it is moved along the xy plane due to its fixed attachment to control arm 100.

Figure 7:
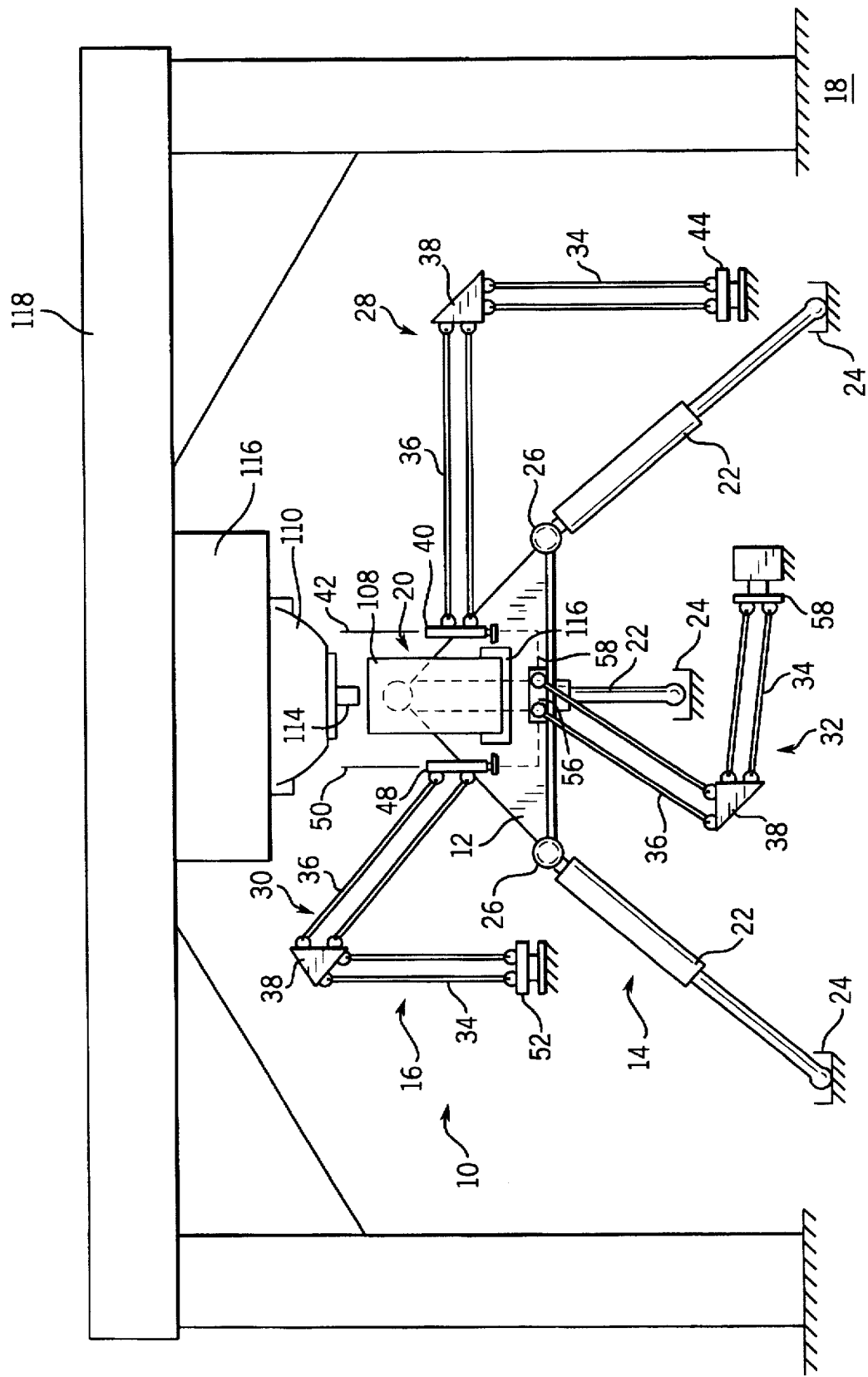
FIG. 7 illustrates one exemplary use of the machine of FIG. 1 in which a workpiece is moved to interact with a tool.

With reference to FIG. 7, an exemplary operation of machine 10, as illustrated in FIG. 1, can be described. An object 20 is carried by machine component 12 and includes a workpiece 108 disposed for cooperation with a tool 110. For example, workpiece 108 could be a metal part undergoing a milling operation by a milling cutter 114. Actuator 14 controls the movement of workpiece 108 with respect to tool 110 as various milling operations are performed on workpiece 108. Simultaneously, control arms 28, 30 and 32 restrict movement of machine component 12 along any of the rotational axes to ensure accurate and precise milling of workkpiece 108.

In FIG. 7, workpiece 108 is mounted to a fixture 116 attached to machine component 12. However, tool 110 could be mounted below, and machine 10 could be suspended from overhead support structure 118. Alternatively, tool 110 could be mounted to machine component 12 to operate on a stationary workpiece.

Figure 8:
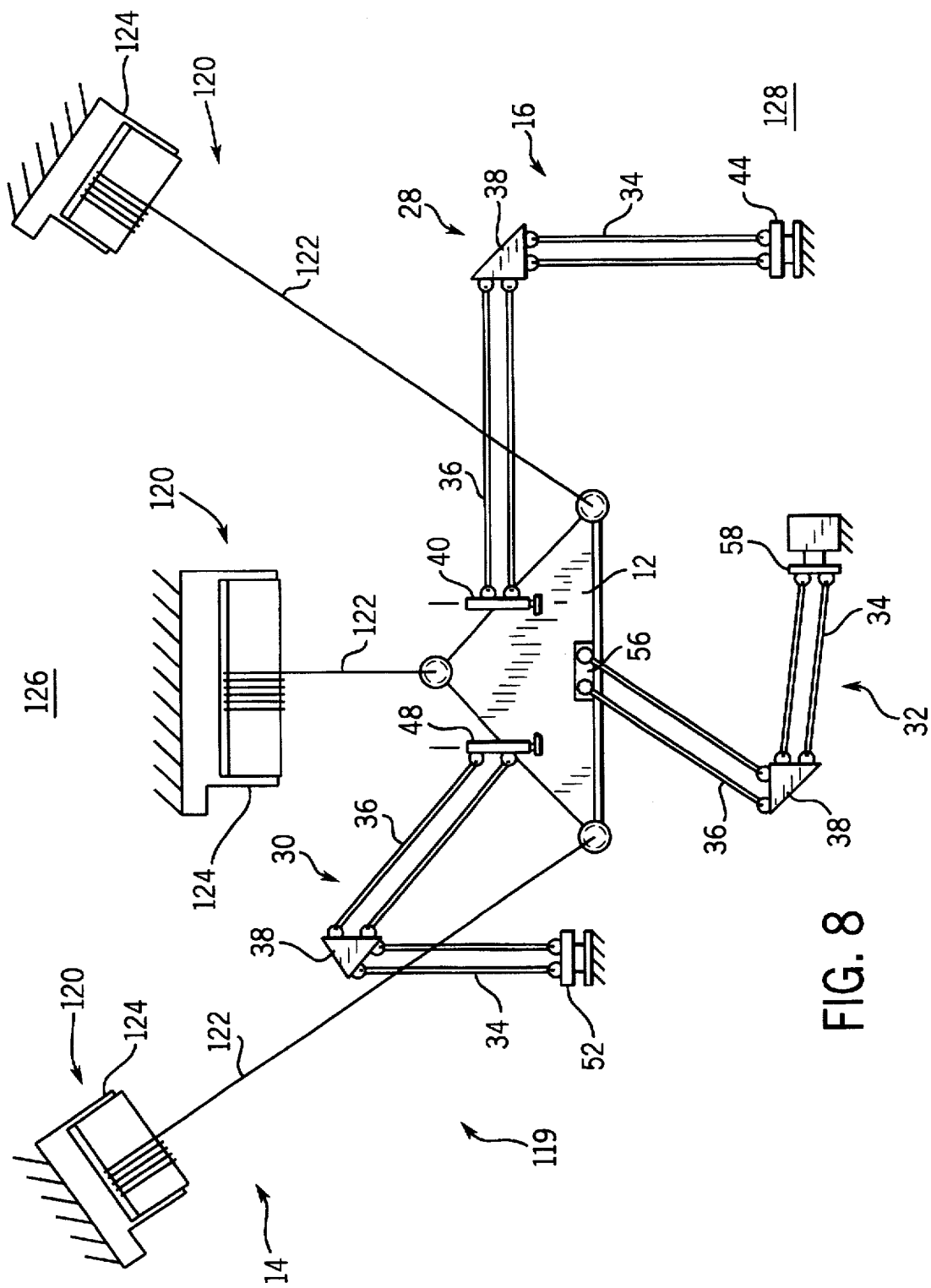
FIG. 8 is a perspective view of another embodiment of the present invention in which the machine component is suspended.

An alternate embodiment of the invention is illustrated in FIG. 8. In this embodiment, control arms 28, 30 and 32 are attached between support structure 18 and machine component 12 as described with reference to FIG. 1. However, the actuator legs 22 of FIG. 1 have been replaced with overhead actuators 120. Overhead actuators 120 include flexible members 122, such as cables, that support machine component 12 from above as illustrated. The lengths of flexible members 122 can be independently controlled to move machine component 12 along a desired path. Powered rollers 124, for instance, can be used to independently wind or unwind each flexible member 122, thereby adjusting the span of each flexible member between the corresponding powered roller and the machine component to move the machine component along a desired path. The weight of machine component 12 and any objects carried by machine component 12 maintains the tensile load on each flexible member 122 as it is unwound from powered roller 124. As described above, the use of one or more control arms such as control arms 28, 30 and 32, prevents undesired rotational movement of machine component 12 as it is moved through space by the flexible members.

In the embodiment illustrated in FIG. 8, powered rollers 124 are attached to an overhead support structure 126 while control arms 28, 30 and 32 are mounted to a lower support structure 128. Alternatively, both the powered rollers and the control arms could be mounted to overhead support structure 126, depending on space considerations and the particular application of machine 10.

It will be understood that the foregoing description is of preferred exemplary embodiments of this invention, and that the invention is not limited to the specific forms shown. For example, different types of actuator legs and actuators can be employed to move the machine component. A wide variety of pivot mounts can be used to connect the actuator legs and control arms between the machine component and the support structure. The design of the four bar linkages and the type of pivot joints connecting the bars can vary depending on the application of machine 10 and the types of forces encountered by the machine component. Additionally, depending on operator preferences and the particular use of machine 10, various control systems can be used to control movement of the machine component via the actuator. For example, specific controllers may work best with certain types of actuators or to control specific movements of machine component 12, which can vary from a simple linear movement to complex movements through three dimensional space. These and other modifications may be made in the design and arrangement of the element without departing from the scope of the invention as expressed in the appended claims.

What is claimed:

1. A machine that can be mounted to a support structure, the machine being designed to move an object along a path with the potential motion of the object being defined by three linear axes and three rotational axes, comprising:

a machine component configured to carry the object;

an actuator connected to the machine component and configured for connection to the support structure to selectively move the machine component with respect to the support structure; and a rotational control system including a control arm having a first end attached to the machine component and a second end configured for pivotable attachment to the support structure, the control arm further including a pair of four bar linkages connected in series, the pair of four bar linkages of the control arm remaining oriented generally parallel to a common plane during movement of the machine component, wherein the control arm permits movement of the machine component along the three linear axes while preventing motion along at least two rotational axes.

2. The machine as recited in claim 1, wherein the actuator includes at least three extensible legs, each leg being pivotably connected to the machine component and pivotably connectable to the support structure.

3. The machine as recited in claim 2, wherein the actuator includes less than six extensible legs.

4. The machine as recited in claim 2, wherein the actuator includes less than four extensible legs.

5. The machine as recited in claim 2, wherein each extensible leg is linearly extensible.

6. The machine as recited in claim 5, wherein each extensible leg comprises a ball screw.

7. The machine as recited in claim 2, wherein the control arm is affixed to the machine component.

8. The machine as recited in claim 1, further comprising a second control arm having a first end attached to the machine component and a second end configured for pivotable attachment to the support structure.

9. The machine as recited in claim 8, wherein the second control arm includes a pair of four-bar linkages connected in series, the pair of four bar linkages of the second control arm remaining oriented generally parallel to a common plane during movement of the machine component.

10. The machine as recited in claim 9, further comprising a third control arm having a first end attached to the machine component and a second end configured for pivotable attachment to the support structure, wherein the third control arm includes a pair of four-bar linkages connected in series, the pair of four bar linkages of the third control arm remaining oriented generally parallel to a common plane during movement of the machine component.

11. The machine as recited in claim 10, wherein the first end of the third control arm pivots about a pivot axis oriented generally transverse to a pivot axis of the first end of the control arm and a pivot axis of the first end of the second control arm.

12. The machine as recited in claim 1, wherein each four-bar linkage includes a pair of generally parallel bars.

13. The machine as recited in claim 12, wherein the bars of each pair of parallel bars are equal in length.

14. A machine for moving an object, the machine being mountable to a support structure, comprising:

a machine component configured to carry the object;

a plurality of legs pivotably connected to the machine component and configured for pivotable connection to the support structure, each leg being selectively actuable to move the machine component with respect to the support structure; and a rotational control system including three control arms, each control arm being connected to the machine component and configured for pivotable connection to the support structure, each control arm including multiple bars arranged as a pair of four bar linkages connected in series, wherein the four bar linkages of each of the control arms are constructed to restrict rotational movement of the machine component solely through tension and compression of the multiple bars, the pair of four bar linkages of each control arm remaining oriented generally parallel to a common plane during movement of the machine component.

15. The machine as recited in claim 14, wherein each four bar linkage includes a pair of equal length parallel bars.

16. The machine as recited in claim 14, wherein the plurality of legs includes three legs that are extendible and retractable.

17. The machine as recited in claim 16, wherein the three control arms are arranged to extend outwardly from the machine component in three unique orientations and to restrict rotational motion of the machine component along the three rotational axes.

18. A method for restricting rotational motion of a machine component, comprising the steps of:

providing a machine component that can move relative to a support structure;

assembling a first four-bar linkage;

assembling a second four-bar linkage;

pivotably connecting the first four-bar linkage to the second four-bar linkage in series, such that pivotable movement of the first four-bar linkage relative to the second four-bar linkage is restricted to one degree of freedom, the first four-bar linkage and second four-bar linkage remaining oriented generally parallel to a common plane during movement of the machine component;

pivotably attaching the first four-bar linkage to the support structure;

connecting the second four-bar linkage to the machine component to resist rotational movement of the machine component;

assembling a third four-bar linkage;

assembling a fourth four-bar linkage;

connecting the third four-bar linkage to the fourth four-bar linkage in series, such that pivotable movement of the third four-bar linkage relative to the fourth four-bar linkage is restricted to one degree of freedom, the third four-bar linkage and fourth four-bar linkage remaining oriented generally parallel to a common plane during movement of the machine component;

pivotably attaching the third four-bar linkage to the support structure; and connecting the fourth four-bar linkage to the machine component at a pivot to restrict rotational movement of the machine component.

19. The method as recited in claim 18, further comprising the step of:

connecting the machine component to the support structure by an actuator capable of moving the machine component with respect to the support structure.

20. The method as recited in claim 19, further comprising the steps of:

assembling a fifth four-bar linkage;

assembling a sixth four-bar linkage;

connecting the fifth four-bar linkage to the sixth four-bar linkage in series, such that pivotable movement of the fifth four-bar linkage relative to the sixth four-bar linkage is restricted to one degree of freedom, the fifth four-bar linkage and sixth four-bar linkage remaining oriented generally parallel to a common plane during movement of the machine component;

pivotably attaching the fifth four-bar linkage to the support structure; and connecting the sixth four-bar linkage to the machine component at a pivot to restrict rotational movement of the machine component.

* * * * *